United States Patent
Ryoo

(10) Patent No.: US 12,007,620 B2
(45) Date of Patent: Jun. 11, 2024

(54) LENS DRIVE DEVICE AND CAMERA MODULE COMPRISING SAME

(71) Applicant: LG INNOTEK CO., LTD., Seoul (KR)

(72) Inventor: Kwang Hyun Ryoo, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 904 days.

(21) Appl. No.: 16/982,947

(22) PCT Filed: Apr. 10, 2019

(86) PCT No.: PCT/KR2019/004282
§ 371 (c)(1),
(2) Date: Sep. 21, 2020

(87) PCT Pub. No.: WO2019/199055
PCT Pub. Date: Oct. 17, 2019

(65) Prior Publication Data
US 2021/0018718 A1  Jan. 21, 2021

(30) Foreign Application Priority Data
Apr. 10, 2018  (KR) .................. 10-2018-0041567

(51) Int. Cl.
*G03B 5/00* (2021.01)
*G02B 7/09* (2021.01)
*G03B 13/36* (2021.01)

(52) U.S. Cl.
CPC .............. *G02B 7/09* (2013.01); *G03B 5/00* (2013.01); *G03B 13/36* (2013.01); *G03B 2205/0046* (2013.01)

(58) Field of Classification Search
CPC . G02B 7/09; G03B 5/00; G03B 13/36; G03B 2205/0046
See application file for complete search history.

(56) References Cited

U.S. PATENT DOCUMENTS

2015/0029605 A1  1/2015  Zhu

FOREIGN PATENT DOCUMENTS

| CN | 1658001 | A | * | 8/2005 | |
| CN | 102768393 | A | | 11/2012 | |
| JP | 2006-133311 | A | | 5/2006 | |
| JP | 2008-304850 | A | | 12/2008 | |
| JP | 2008304850 | A | * | 12/2008 | |
| JP | 2015166595 | A | * | 9/2015 | ............ F01B 1/10 |
| KR | 10-2011-0009779 | A | | 1/2011 | |
| KR | 20110009779 | A | * | 1/2011 | |
| KR | 10-1451652 | B1 | | 10/2014 | |
| KR | 101451652 | B1 | * | 10/2014 | |
| KR | 10-2015-0124036 | A | | 11/2015 | |

(Continued)

*Primary Examiner* — Mustak Choudhury
*Assistant Examiner* — K Muhammad
(74) *Attorney, Agent, or Firm* — Birch, Stewart, Kolasch & Birch, LLP

(57) ABSTRACT

A lens drive device includes a housing; a bobbin arranged inside the housing; a magnet arranged on the bobbin; a coil arranged on the housing and facing the magnet; a coupling member arranged on the inner surface of the housing; a roller rotatably arranged on the coupling member; and a rail arranged on the bobbin. The rail is guided according to the rotation of the roller.

14 Claims, 19 Drawing Sheets

10

(56) References Cited

FOREIGN PATENT DOCUMENTS

| KR | 20150124036 A | * | 11/2015 |
|----|---------------|---|---------|
| KR | 10-1779817 B1 |   | 9/2017  |
| KR | 101779817 B1  | * | 9/2017  |
| KR | 20190116808 A | * | 10/2019 |

* cited by examiner

LENS DRIVE DEVICE AND CAMERA MODULE COMPRISING SAME

CROSS REFERENCE TO RELATED APPLICATIONS

This application is the National Phase of PCT International Application No. PCT/KR2019/004282, filed on Apr. 10, 2019, which claims priority under 35 U.S.C. 119(a) to Patent Application No. 10-2018-0041567, filed in the Republic of Korea on Apr. 10, 2018, all of which are hereby expressly incorporated by reference into the present application.

TECHNICAL FIELD

The present invention relates to a lens driving device and a camera module comprising the same.

BACKGROUND ART

The content described below provides background information for this embodiment, but does not describe the prior art.

As the spread of various mobile terminals is widely generalized and wireless Internet services are commercialized, the demands of consumers related to the mobile terminals are also diversified, and various types of additional devices are mounted on the mobile terminals.

A representative one is a camera module that photographs a subject as a photo or video. Meanwhile, an auto focus function is being applied to a recent camera module to automatically adjust focus according to a distance of a subject.

The auto focus function is generally performed by moving the bobbin in which the lens is disposed, and the conventional lens driving device supports the bobbin through a spring. However, when supporting the movement of the bobbin through the spring as in the prior art, there is a problem that the movable distance of the bobbin is limited within the elastic range of the spring.

DETAILED DESCRIPTION OF THE INVENTION

Technical Subject

The problem to be solved by the present invention is to provide a lens driving device and a camera module comprising the same, which can be used not only for the auto focus function but also for the zoom function because the moving distance of the bobbin is increased.

Technical Solution

For solving the above problem, a lens driving device according to one aspect of the present invention comprises: a housing; a bobbin disposed inside the housing; a magnet disposed on the bobbin; a coil disposed on the housing and facing the magnet; a coupling member disposed on the inner surface of the housing; a roller rotatably disposed on the coupling member; and a rail disposed on the bobbin, wherein the rail is guided according to the rotation of the roller.

Also, the roller comprises at least two rollers, the at least two rollers are spaced apart from each other in the horizontal direction, the coil is disposed between the at least two rollers; the rail comprises at least two rails; the at least two rails are spaced apart from each other in the horizontal direction; and the magnet may be disposed between the at least two rails.

Also, the bobbin comprises a first groove formed by being extended in an optical axis direction on an outer lateral surface, and the rail may be disposed in the first groove.

Also, the rail may be formed by being extended in the optical axis direction.

Also, the rail is formed to be protruded toward the housing, and the cross-section of the rail may be a semicircular shape.

Also, the rollers may comprise a plurality of rollers spaced apart from one another in the optical axis direction.

Also, the roller may have a shape in which the diameter decreases as it travels from both ends toward the central portion.

Also, the roller and the rail may contact at two contact points.

Also, the two contact points may be positions symmetrical to each other with respect to the central portion of the roller.

Also, the roller may comprise a protruding portion shaped by being extended from both ends.

Also, the coupling member comprises a flat plate disposed on the inner lateral surface of the housing, and a plurality of vertical plates being extended and formed from the flat plate toward the bobbin, and the plurality of vertical plates may be spaced apart from one another, and may comprise a first hole being penetrated by the protruding portion.

Also, the bobbin comprises first to fourth surfaces formed on the outer surface; the magnet comprises a first magnet disposed on the first surface and a second magnet disposed on the third surface, wherein the first magnet and the second magnet are symmetrical to each other with respect to the optical axis; the housing comprises fifth to eighth surfaces formed on an inner lateral surface so as to face each of the first to fourth surfaces; the coil comprises a first coil disposed on the fifth surface and a second coil disposed on the seventh surface, wherein the first coil and the second coil are symmetrical with respect to the optical axis; the coupling member comprises a first coupling member disposed on the fifth surface, and a second coupling member disposed on the seventh surface, wherein the first coupling member and the second coupling member are symmetrical to each other with respect to the optical axis; and the roller comprises a first roller disposed in the first coupling member, a second roller disposed in the second coupling member; the rail comprises a first rail disposed on the first surface and a second rail disposed on the third surface, wherein the first rail and the second rail may be symmetrical with respect to the optical axis.

Also, the bobbin comprises first to fourth surfaces formed on an outer lateral surface; the magnet comprises a first magnet disposed on the first surface, a second magnet disposed on the third surface, wherein the first magnet and the second magnet is symmetric to each other with respect to the optical axis; the housing comprises fifth to eighth surfaces formed on an inner lateral surface so as to face each of the first to fourth surfaces; the coil comprise a first coil disposed on the fifth surface, and a second coil disposed on the seventh surface, wherein the first coil and the second coil are symmetrical to each other with respect to the optical axis; the coupling member comprises a first coupling member disposed on the sixth surface and a second coupling member disposed on the eighth surface, wherein the first coupling member and the second coupling member are symmetrical to each other with respect to the optical axis; the roller comprises a first roller disposed in the first coupling member, a second roller disposed in the second coupling member; and the rail comprises a first rail disposed on the second surface and a second rail disposed on the fourth surface, wherein the first rail and the second rail may be symmetrical to each other with respect to the optical axis.

For solving the above problem, a lens driving device according to another aspect of the present invention comprises: a housing; a bobbin comprising a second groove formed on an outer lateral surface and disposed in the housing; a magnet disposed in the bobbin; a coil disposed in the housing and facing the magnet; a roller rotatably disposed in the second groove; and a first rail disposed on the inner lateral surface of the housing, wherein the roller can be guided and rotated along the first rail.

Also, the roller may comprise protruding portions shaped by being extended at both ends.

Also, the bobbin comprises a second hole formed on an inner lateral surface facing each other of the second groove, and the second hole can be penetrated by the protruding portion.

Also, the bobbin comprises a third groove formed on an inner lateral surface facing each other of the second groove, and both ends of the roller may be disposed in the third groove.

Also, the area of the roller disposed in the third groove decreases in diameter as it travels toward the both ends, and the area of the roller disposed between inner lateral surfaces facing each other of the second groove may decrease in diameter as it travels toward the central portion.

Also, the diameter of the central portion of the roller may be formed to be smaller than the diameter of both ends of the roller.

Further, a second rail disposed in the second groove is further included, and the second rail and the roller may be in contact with each other at two contact points.

For solving the above problem, a camera module according to one aspect of the present invention comprises: a housing; a bobbin disposed inside the housing; a lens module disposed on the bobbin; a magnet disposed on the bobbin; a coil disposed on the housing and facing the magnet; a coupling member disposed on the inner surface of the housing; a roller rotatably disposed on the coupling member; and a rail disposed on the bobbin, wherein the rail is guided according to the rotation of the roller.

Advantageous Effects

Through the present embodiment, the moving distance of the bobbin is increased, and thereby a lens driving device and a camera module comprising the same that can be used for a zoom function as well as an auto focus function can be provided.

BEST MODE

Figure 1:
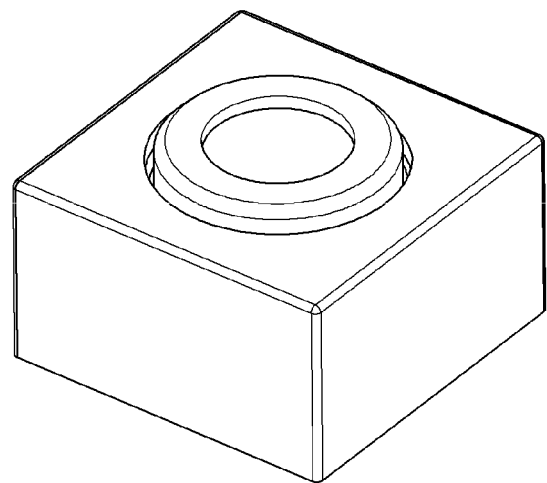
FIG. 1 is a perspective view of a lens driving device according to an embodiment of the present invention.

Hereinafter, embodiments of the present invention will be described in detail with reference to the accompanying drawings. Advantages and features of the present invention, and methods for achieving them will be apparent with reference to the embodiments described below in detail in conjunction with the accompanying drawings. However, the present invention is not limited to the embodiments disclosed below, but may be implemented in various different forms, and the present embodiments are merely provided to complete the disclosure of the present invention and to fully inform the scope of the invention to those skilled in the art to which the present invention belongs, and the present invention will be merely defined by the scope of the claims. Like refer to like elements throughout. Throughout the specification, the same reference numeral refers to the same component.

Unless otherwise defined, all terms (including technical and scientific terms) used in the present specification may be used in a meaning that can be commonly understood by those skilled in the art to which the present invention belongs. In addition, terms that are defined in commonly used dictionaries are not ideally or excessively interpreted unless they are specifically defined clearly.

In addition, the terms used in the embodiments of the present invention are intended to describe the embodiments and are not intended to limit the present invention. In this specification, the singular may also include the plural unless specifically stated in the text. As used in this specification, 'comprises' and/or 'comprising' means not to exclude the presence or addition of one or more other components, steps, and/or operations in addition to the components, steps, and/or operations mentioned. And "and/or" includes each and all combinations of one or more of the items mentioned.

In addition, in describing the components of the embodiment of the present invention, terms such as first, second, A, B, (a), and (b) may be used. These terms are merely intended to distinguish the components from other components, and the terms do not limit the nature, order or sequence of the components. When a component is described as being 'connected', 'coupled' or 'jointed' to another component, the component may be directly connected, coupled or jointed to the another component, but it should be also understood that yet another component may be 'connected', 'coupled' or 'jointed' between the component and the another component.

'Optical axis direction' used below is defined as the optical axis direction of the lens coupled to the lens driving device. Meanwhile, the 'optical axis direction' may correspond to the 'up and down' direction and the 'z axis direction.

The "auto focus function" used below is defined as the function that automatically focuses on a subject by moving the lens in the direction of the optical axis according to the distance of the subject so that clear images of the subject can be obtained on the image sensor. Meanwhile, 'auto focus' can be used interchangeably with 'Auto Focus (AF)'.

Hereinafter, the configuration of an optical apparatus according to the present embodiment will be described.

The optical apparatus may be any one of a mobile phone, a mobile phone, a smart phone, a portable smart device, a digital camera, a laptop computer, a digital broadcasting terminal, a personal digital assistant (PDA), a portable multimedia player (PMP), and a navigation device. However, the type of the optical apparatus is not limited thereto, and any device for capturing an image or a picture may be included in the optical apparatus.

The optical apparatus may comprise a main body. The main body may form the appearance of the optical apparatus. The main body may accommodate a camera module. A display unit may be disposed on one surface of the main body. For example, the display unit and the camera module may be disposed on one surface of the main body, and another camera module may be additionally disposed on the other surface (a surface opposite to the one surface) of the main body.

The optical apparatus may comprise a display unit. The display unit may be disposed on one surface of the main body. The display unit may output an image photographed by the camera module.

The optical apparatus may comprise a camera module. The camera module may be disposed in the main body. At least a portion of the camera module may be accommodated in the main body. The camera module may be provided in plurality. The camera module may be disposed respectively on one surface of the main body and the other surface of the main body. The camera module may photograph an image of a subject.

Hereinafter, the configuration of a camera module according to the present embodiment will be described with reference to the drawings.

The camera module may comprise a lens module 12. The lens module 12 may comprise at least one lens. The lens module 12 may comprise a lens and a barrel. The lens module 12 may be coupled to a bobbin 100 of a lens driving device. The lens module 12 may be coupled to the bobbin 100 by screw-coupling and/or an adhesive. The lens module 12 may be moved integrally with the bobbin 100.

The camera module may comprise a filter. The filter may comprise an infrared filter. The infrared filter may block the light of an infrared region from being incident on an image sensor. The infrared filter may be disposed between the lens module 12 and the image sensor. In one example, the infrared filter may be disposed in a sensor base disposed between the lens driving device 10 and a printed circuit board. In another example, the infrared filter can be placed in a hole in the base.

The camera module may comprise a printed circuit board. A lens driving device 10 may be disposed on the printed circuit board. At this time, a sensor base may be disposed between the printed circuit board and the lens driving device 10. The printed circuit board may be electrically connected to the lens driving device 10. An image sensor may be disposed on the printed circuit board. The printed circuit board can be electrically connected to the image sensor.

The camera module may comprise an image sensor. The image sensor can be disposed on a printed circuit board. The image sensor can be electrically connected to the printed circuit board. In one example, the image sensor may be coupled to a printed circuit board by a surface mounting technology (SMT). As another example, the image sensor may be coupled to a printed circuit board by a flip chip technology. The image sensor may be disposed such that the optical axis is coincided with the lens module 12. That is, the optical axis of the image sensor and the optical axis of the lens module 12 may be aligned. The image sensor may convert light irradiated to the effective image area of the image sensor into an electrical signal. The image sensor may be any one of a charge coupled device (CCD), a metal oxide semi-conductor (MOS), a CPD, and a CID.

The camera module may comprise a control unit. The control unit may be disposed on the printed circuit board. The control unit may control the direction, intensity, and amplitude of the current supplied to a coil 500 of the lens driving device 10. The control unit may perform an auto focus function by controlling the lens driving device 10. Furthermore, the control unit may detect the position of the bobbin 100 through a Hall sensor to perform auto focus feedback control for the lens driving device 10. In addition, the control unit may perform a zoom function by controlling the lens driving device 10. The control unit may also perform feedback control for the zoom function through the Hall sensor.

Hereinafter, the present invention will be described in more detail according to the accompanying drawings.

Figure 2:
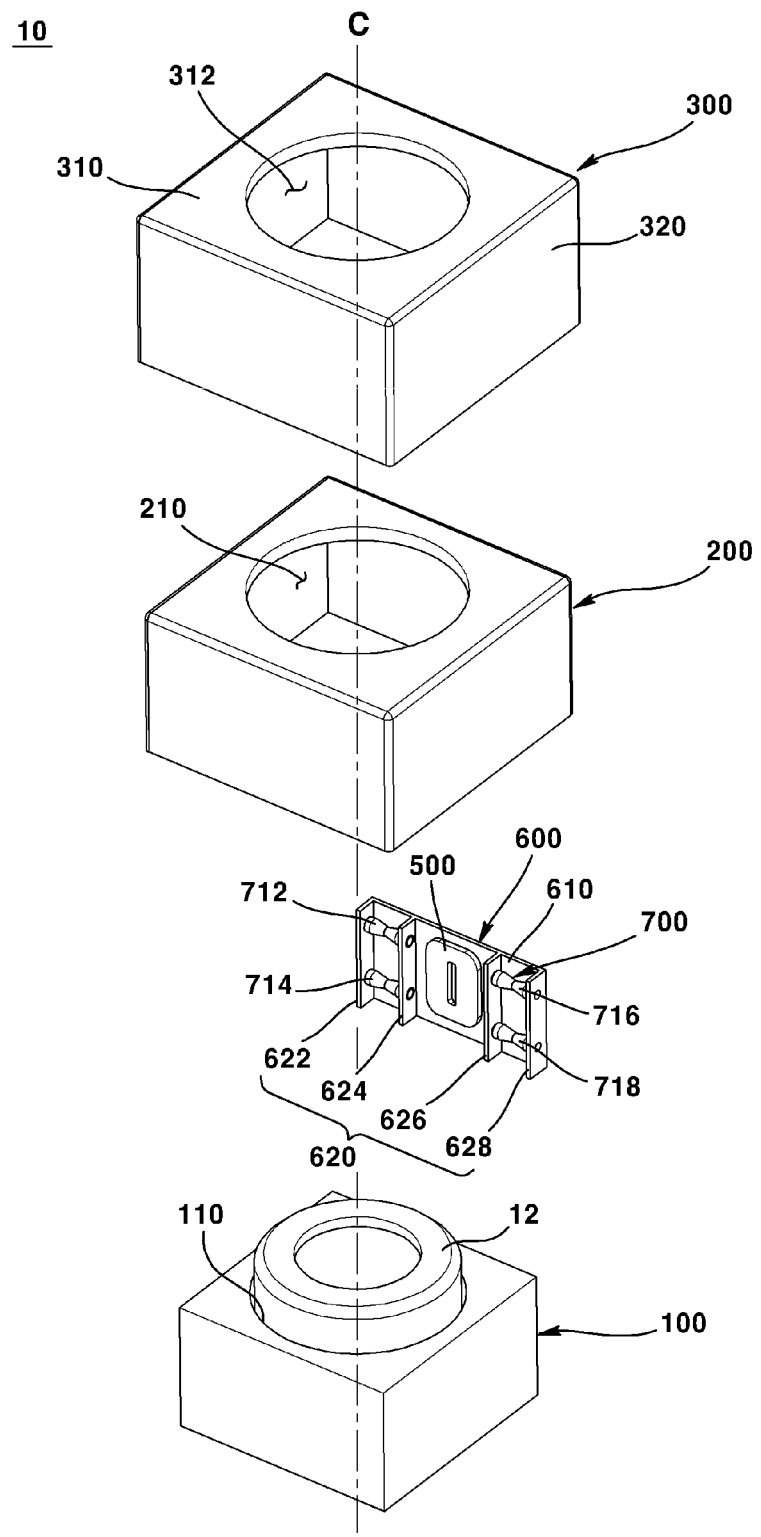
FIGS. 2 and 3 are exploded perspective views of a lens driving device according to an embodiment of the present invention.
Figure 3:
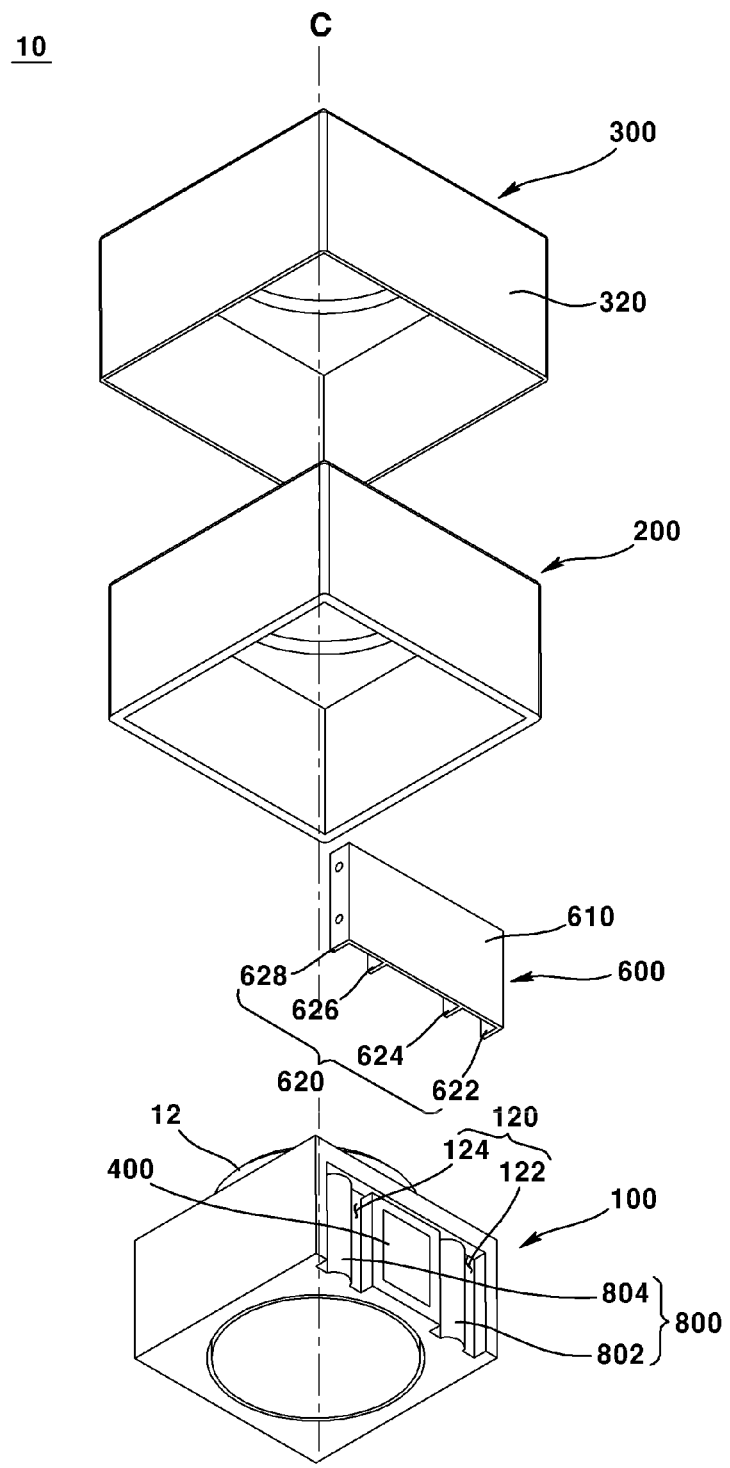
Figure 4:
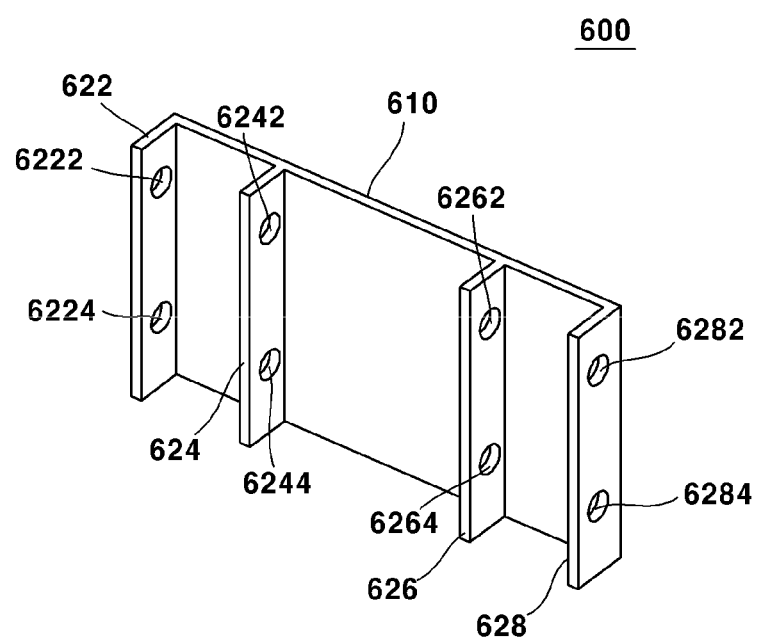
FIG. 4 is a perspective view of a coupling member of a lens driving device according to an embodiment of the present invention.
Figure 5:
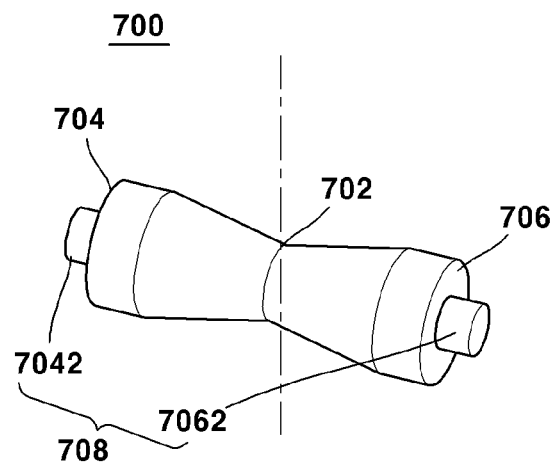
FIG. 5 is a perspective view of a roller of a lens driving device according to an embodiment of the present invention.
Figure 6:
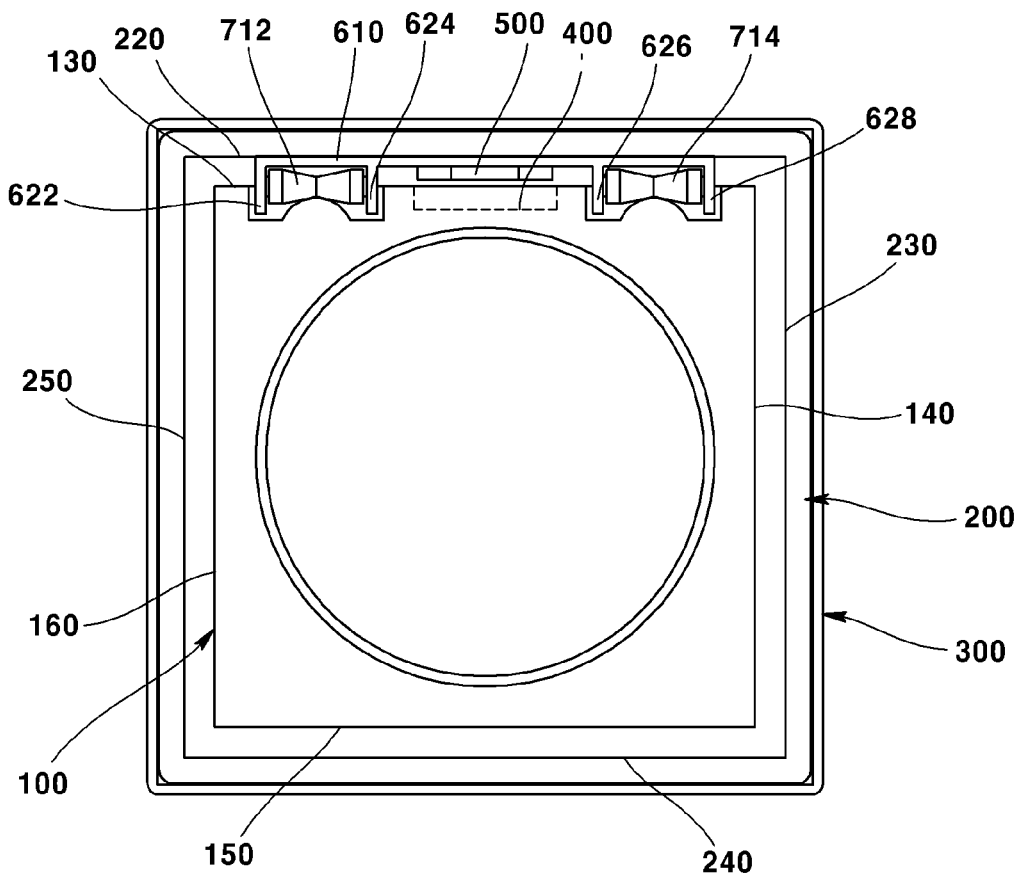
FIG. 6 is a bottom view of a lens driving device according to an embodiment of the present invention.
Figure 7:
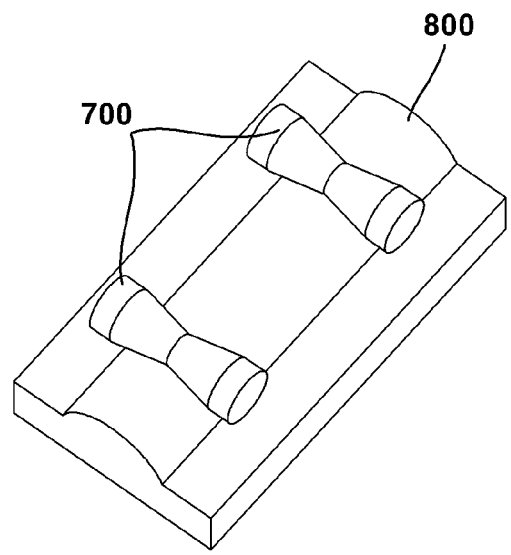
FIG. 7 is a perspective view of a roller and a rail of a lens driving device according to an embodiment of the present invention.
Figure 8:
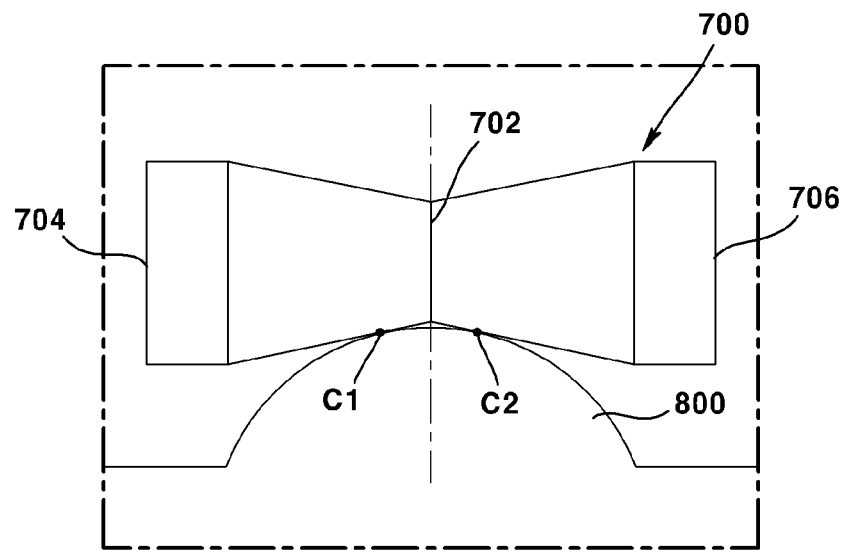
FIG. 8 is a cross-sectional view of a roller and a rail of a lens driving device according to an embodiment of the present invention.

FIG. 1 is a perspective view of a lens driving device according to an embodiment of the present invention; FIGS. 2 and 3 are exploded perspective views of a lens driving device according to an embodiment of the present invention; FIG. 4 is a perspective view of a coupling member of a lens driving device according to an embodiment of the present invention; FIG. 5 is a perspective view of a roller of a lens driving device according to an embodiment of the present invention; FIG. 6 is a bottom view of a lens driving device according to an embodiment of the present invention; FIG. 7 is a perspective view of a roller and a rail of a lens driving device according to an embodiment of the present invention; and FIG. 8 is a cross-sectional view of a roller and a rail of a lens driving device according to an embodiment of the present invention.

Referring to FIGS. 1 to 8, a lens driving device 10 according to an embodiment of the present invention may comprise a bobbin 100, a housing 200, a cover can 300, a magnet 400, a coil 500, a coupling member 600, a roller 700, and a rail 800, however, other additional components are not excluded.

Figure 12:
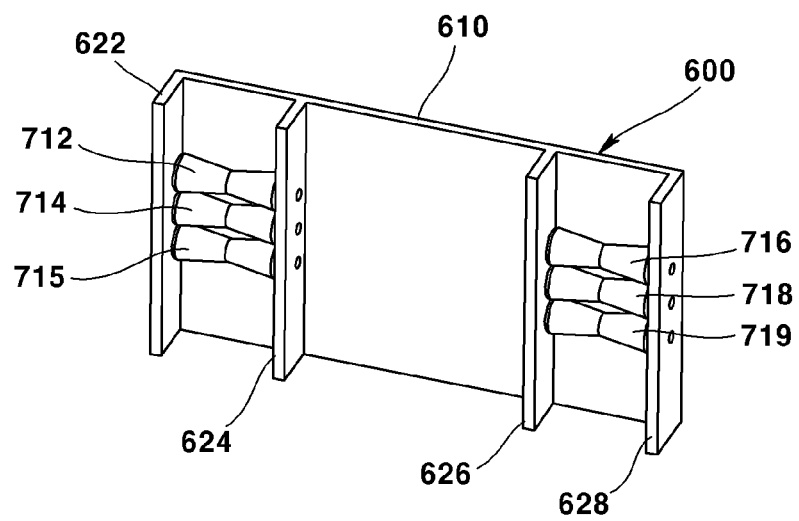
FIG. 12 is a perspective view of a modified embodiment of the coupling member of the lens driving device according to an embodiment of the present invention.
Figure 16:
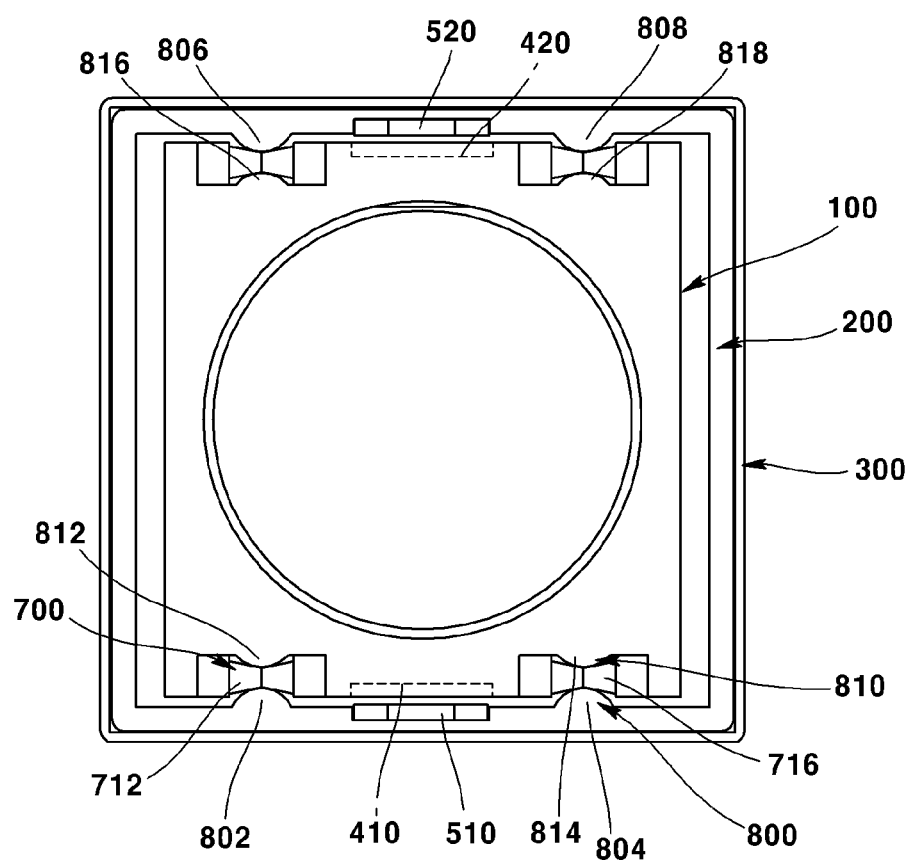

The lens driving device 10 may be a voice coil motor (VCM). The lens driving device 10 according to an embodiment of the present invention may move the bobbin 100 accommodating the lens module 12 by 0.5 mm or more in the optical axis C direction due to the electromagnetic force between at least one coil and the magnet. At this time, a roller 700 and a rail 800 structure may be applied to minimize the frictional force generated while the bobbin 100 moves. The rail 800 is attached to a moving part, and the roller 700 is attached to a fixed part so as to perform rolling motion in place. Or, as illustrated in FIG. 12 and FIG. 16, as another modified embodiment, the rail 800 is attached to the housing 200 which is a fixed part, and the roller 700 is attached to the bobbin 100 which is a moving part to perform rolling motion. Since the roller 700 and the rail 800 are in contact with each other at two contact points C1 and C2 to guide the movement of the bobbin 100, frictional force against the movement of the bobbin 100 can be reduced.

The lens driving device 10 may comprise a bobbin 100. The bobbin 100 may be disposed on a plurality of side walls of the housing 200. The bobbin 100 may be disposed on the base. The bobbin 100 may be disposed to be spaced apart from the housing 200 and/or the base at least in a portion thereof. The bobbin 100 may be moved along the inner surfaces 220, 230, 240, and 250 of the side walls of the housing 200. The bobbin 100 can be moved with respect to the base and an image sensor. The bobbin 100 may be moved in an optical axis C direction (vertical direction, z-axis direction, up-down direction) with respect to the image sensor. The bobbin 100 may be moved on the optical axis C of the lens module 12 and/or the image sensor.

In the present embodiment, the bobbin 100 may be moved to drive an autofocus function. Also, the bobbin 100 may be moved to drive a zoom function. The maximum movable range (stroke) of the bobbin 100 for the autofocus function may be 0.2 to 0.4 mm, and the maximum movable range (stroke) of the bobbin 100 for the zoom function may be 3 to 5 mm. In more detail, the maximum movable range (stroke) of the bobbin 100 for the autofocus function may be about 0.3 mm, and the maximum movable range of the bobbin 100 for the zoom function may be about 4 mm. Here, the 'maximum movable range (stroke)' may be a distance difference between the position of the bobbin 100 in a state where the bobbin 100 is moved upward as far as possible and the position of the bobbin 100 in a state where the bobbin 100 is moved downward as far as possible.

The bobbin 100 may comprise a through hole 110. The through hole 110 may penetrate the central portion of the bobbin 100 in the vertical direction. The lens module 12 may be coupled to the through hole 110. A thread may be formed on the inner circumferential surface of the bobbin 100 that forms the through hole 110. In this case, the lens module 12 and the bobbin 100 may be screw-coupled. The bobbin 100 may be formed through injection.

The bobbin 100 may comprise a plurality of lateral surfaces. The plurality of lateral surfaces may comprise first to fourth surfaces 130, 140, 150, and 160. The bobbin 100 may comprise a first surface 130 and a third surface 150 disposed opposite each other, and a second surface 140 and a fourth surface 160 disposed opposite each other between the first surface 130 and the second surface 150.

The bobbin 100 may comprise a groove 120. The groove 120 may be a 'rail groove' in which a rail 800 is disposed. Also, the groove 120 may be referred to as a 'first groove' and the like to distinguish it from other grooves. The groove 120 may be formed on a lateral surface of the bobbin 100. The rail 800 may be disposed in the groove 120. The groove 120 may be extended from the lateral surface of the bobbin 100 in the optical axis C direction or in the vertical direction.

The width of the groove 120 may be extended from the lower end to the upper end of the bobbin 100. Or, the vertical length of the groove 120 may correspond to the vertical length of the rail 800. Through this, the moving distance of the bobbin 100 can be maximized. The width of the groove 120 (horizontal length) may be greater than the width of the rail 800. Through this, the number of points in contact between the roller 700 and the rail 800 can be reduced to minimize the frictional force.

The groove 120 may comprise a plurality of grooves 122 and 124 formed on one surface of the bobbin 100. The plurality of grooves 122 and 124 may be formed with a width corresponding to each other and a length corresponding to each other (vertical length). A magnet 400 may be disposed between the plurality of grooves 122 and 124. The plurality of grooves 122 and 124 may be formed at positions symmetrical to each other centered around the magnet 400. Through this, the bobbin 100 can be guided stably.

The lens driving device 10 may comprise a housing 200. A printed circuit board may be disposed under the housing 200. The housing 200 may be disposed outside the bobbin 100. The housing 200 may accommodate the bobbin 100 therein. The housing 200 may comprise an accommodation space therein. The bobbin 100 may be disposed in the accommodation space of the housing 200. The housing 200 may be spaced apart from the bobbin 100 at least in a portion thereof. The housing 200 may be formed through injection.

The upper surface of the housing 200 may comprise an opening 210 being overlapped with the upper surface of the lens module 12. At least a portion of the lens module 12 may penetrate the opening 210. The upper portion of the lens module 12 may be disposed on the same plane as the opening 210.

The housing 200 may comprise a side wall. The side wall forms an accommodation space therein, and the bobbin 100 may be disposed in the accommodation space formed by the side wall. The side wall may comprise a plurality of side walls. The plurality of side walls may comprise fifth to eighth surfaces 220, 230, 240, and 250 formed on the inner lateral surface. The plurality of side walls of the housing 200 may comprise a fifth face 220 facing the first surface 130 of the bobbin 100, a sixth surface 230 facing the second surface 140 of the bobbin 100, a seventh surface 240 facing the third surface 150 of the bobbin 100, and an eighth surface 250 facing the fourth surface 160 of the bobbin 100.

The lens driving device 10 may comprise a cover can 300. The cover can 300 may be coupled with the base 500. The cover can 300 can accommodate the housing 100 therein. The cover can 300 may form an external appearance of the lens driving device. The cover can 300 may be in the shape of a cuboid with a lower surface open. The cover can 300 may be non-magnetic. The cover can 300 may be formed of a metal material. The cover can 300 may be formed of a metal sheet material. The cover can 300 may be connected to the ground portion of the printed circuit board 10. Through this, the cover can 300 may be grounded. The cover can 300 may block the electromagnetic interference (EMI).

The cover can 300 may comprise an upper plate 310 and a side plate 320. The cover can 300 may comprise an upper plate 310 comprising holes and a plurality of side plates 320 being extended downward from an outer periphery or edge of the upper plate 310. The lower end of the side plate 320 may be disposed on a portion of the base. The inner surface of the side plate 320 may be coupled with the base by an adhesive.

The upper plate 310 of the cover can 300 may comprise a through hole 312. The through hole 312 may be formed on the upper plate 310 of the cover can 300. The through hole 312 may expose at least a portion of the lens module 12 upward (outside). The through hole 312 may be formed in a size and shape corresponding to the lens module 12. The size of the through hole 312 may be formed larger than the diameter of the lens module 12 so that the lens module 12 can be inserted and assembled through the through hole 312. The through hole 312 of the cover can 300 may be formed in a shape corresponding to an opening 210 of the upper surface of the housing 200. The through hole 312 of the cover can 300 may be overlapped with the opening 210 of the upper surface of the housing 200. A light introduced through the through hole 312 may pass through the lens module 12. At this time, the light passing through the lens module 12 may be converted into an electrical signal from the image sensor and obtained as an image.

The lens driving device 10 may comprise a magnet 400. The magnet 400 may be disposed in the bobbin 100. The magnet 400 may face the coil 500. When an electric current is applied to the coil 500, an attractive force or a repulsive force may act between the magnet 400 and the coil 500 by electromagnetic interaction. Through this, the bobbin 100 and the lens module 12 moving integrally with the magnet 400 may be moved. That is, the magnet 400 may provide a driving force to the bobbin 100 through the electromagnetic interaction with the coil 500.

The lens driving device 10 may comprise a coil 500. The coil 500 may be disposed inside the housing 200. The coil 500 may face the magnet 400. The coil 500 may be attached to a coupling member 600 attached to the inner lateral surface of the housing 200. One surface of the coil 500 is attached to a flat plate 610 of the coupling member 600 and the other surface of the coil 500 may face one surface of the magnet 400. The coil 500 may be spaced apart from the magnet 400. The coil 500 may be electrically connected to a substrate. The coil 500 may be connected to a printed circuit board through the substrate to receive a current.

The lens driving device 10 may comprise a coupling member 600. The coupling member 600 may be disposed on the inner lateral surface of the housing 200. The coupling member 600 may be integrally formed with the housing 200. Alternatively, the coupling member 600 may be manufactured separately from the housing 200 and then attached to the inner lateral surface of the housing 200.

The coupling member 600 may comprise a flat plate 610 attached to the inner lateral surface of the housing 200. One surface of the flat plate 610 may be attached to the inner lateral surface of the housing 200, and the coil 500 may be attached to the other surface of the flat plate 610. The flat plate 610 may be formed in the shape of a rectangular plate, but is not limited thereto and may be variously changed.

The coupling member 600 may comprise a vertical plate 620 formed by being extended from the flat plate 610 toward the bobbin 100. The vertical plate 620 may be formed by being extended in the optical axis C direction or vertical direction. The height of the vertical plate 620 may be the same as the height of the groove 120 of the bobbin 100. At least a portion of the vertical plate 620 may be disposed in the groove 120 of the bobbin 100. Through this, space efficiency can be improved. At least a portion of the vertical plate 620 may be disposed spaced apart from the inner lateral surface of the groove 120 of the bobbin 100.

The vertical plate 620 may comprise a plurality of vertical plates. The plurality of vertical plates may comprise first to fourth vertical plates 622, 624, 626, and 628. The first to fourth vertical plates 622, 624, 626, and 628 may be formed spaced apart from each other. Rollers 700 may be disposed in a space among the plurality of vertical plates. The rollers 700 may be disposed in the spaces between the first vertical plate 622 and the second vertical plate 624, between the third vertical plate 626 and the fourth vertical plate 628, and between 622, 624, 626, and 628. The coil 500 may be disposed in a space between the plurality of vertical plates. The coil 500 may be attached to the flat plate 610 between the second vertical plate 624 and the third vertical plate 626.

The vertical plate 620 may comprise a hole. The hole of the vertical plate 620 may be a 'roller hole' penetrated by a protruding portion 708 of the roller 700. Also, a hole may be referred to as a 'first hole' to distinguish it from other holes. The diameter of the hole of the vertical plate 620 may correspond to the diameter of the protruding portion 708 of the roller 700.

The hole may comprise a plurality of holes 6222, 6224, 6242, 6244, 6262, 6264, 6282, and 6284. Each of the first to fourth vertical plates 622, 624, 626, and 628 may comprise two holes 6222, 6224, 6242, 6244, 6262, 6264, 6282, and 6284, respectively. Two rollers 712 and 714 are mounted in the holes 6222, 6224, 6242, and 6244 formed in the first and second vertical plates 622 and 624, and two rollers 716 and 718 may be mounted in the holes 6262, 6264, 6282, and 6284 formed in the third and fourth vertical plates 626 and 628.

The lens driving device 10 may comprise a roller 700. The roller 700 may be disposed in the coupling member 600. The roller 700 may be rotatably coupled to the coupling member 600. When the bobbin 100 is moved in the direction of the optical axis C, the roller 700 may be in contact with the rail 800 so as to be rotated in place. The roller 700 may be spaced apart from the flat plate 610. At least a portion of the roller 700 may have a shape in which the diameter decreases from the both ends 704 and 706 toward the central portion 702. The ratio of the decreasing diameter as it travels from the both ends 704 and 706 of the roller 700 toward the central portion 702 may be constant, may be gradually increased, or may be gradually decreased, but is not limited thereto and may be variously changed. Through this, it is possible to minimize the number of contact points in contact between the roller 700 and the rail 800. The vertical length of the central portion 702 of the roller 700 may be smaller than the vertical length of both ends 704 and 706 of the roller 700.

The roller 700 may comprise a protruding portion 708. The protruding portion 708 may comprise a plurality of protruding portions. The plurality of protruding portions may comprise a first and a second protruding portion 7042 and 7062. The first protruding portion 7042 may protrude from one end 704 of the roller 700, and the second protruding portion 7062 may protrude from the other end 706 of the roller 700. At this time, the first protruding portion 7042 and the second protruding portion 7062 may be formed to be symmetrical to each other with respect to the central portion 702 of the roller 700. The diameter of the protruding portion 708 may be formed to be smaller than the diameter of both ends 704 and 706 of the roller 700. The first protruding portion 7042 penetrates the holes 6222 and 6224 of the first vertical plate 622 or the holes 6262 and 6264 of the third vertical plate 626, and the second protruding portion 7062 may penetrate the holes 6242 and 6244 of the second vertical plate 624 or the holes 6282 and 6284 of the fourth vertical plate 628. Through this, the roller 700 can be rotatably disposed in the coupling member 600 without adding a separate component.

The roller 700 may be in contact with the rail 800. The roller 700 may be rotated in place when the rail 800 is moved in the vertical direction. When the rail 800 is moved upward, the roller 700 is rotated in one direction, and when the rail 800 is moved downward, the roller 700 is rotated in the other direction. The up-down movement of the rail 800 may be guided by the rotation of the roller 700. The horizontal length of the roller 700 may be smaller than the horizontal width of the rail 800. The roller 700 may be in contact with the rail 800 at two contact points C1 and C2. The two contact points C1 and C2 may be formed at positions symmetrical to each other with respect to the central portion 702 of the roller 700. Through this, the up-down movement of the bobbin 100 can be guided stably.

The roller 700 may comprise a plurality of rollers. The plurality of rollers may comprise four rollers 712, 714, 716, and 718. At least two of the four rollers may be spaced apart in the horizontal direction, and at least two rollers may be disposed spaced apart in the vertical direction. The coil 500 may be disposed between at least two rollers disposed spaced apart in the horizontal direction.

The lens driving device 10 may comprise a rail 800. The rail 800 may be disposed in the groove 120 of the bobbin 100. The rail 800 may be formed to be extended in the direction of the optical axis C. The vertical length of the rail 800 may be corresponding to the vertical length of the groove 120 of the bobbin 100 or may be small. The width of the rail 800 (horizontal length) may be smaller than the width of the groove 120 of the bobbin 100. The rail 800 may be seated in the groove 120 of the bobbin 100. The rail 800 may be formed to be protruded toward the housing 200. The rail 800 may be located further inside than the outer lateral surface of the bobbin 100. At least a portion of the cross-section of the rail 800 may be in the shape of a semi-circle. Through this, the space efficiency can be enhanced, and the number of contact points in contact between the roller 700 and the rail 800 can be minimized.

The rail 800 can be in contact with the roller 700. The movement of the rail 800 in the up-down direction can be guided by the rotation of the roller 700 in place. When the rail 800 is moved upward, the roller 700 is rotated in one direction to guide the upward movement of the rail 800, and when the rail 800 is moved downward, the roller 700 is rotated in the other direction, and thereby it is possible to guide the downward movement of the rail 800. The rail 800 may be in contact with the roller 700 at two contact points C1 and C2. The two contact points C1 and C2 may be formed at positions symmetrical to each other with respect to the central portion 702 of the roller 700. The horizontal width of the rail 800 may be formed to be smaller than the horizontal length of the roller 700.

The rail 800 may comprise a plurality of rails. The plurality of rails may comprise two rails 802 and 804. The two rails 802 and 804 may be spaced apart from each other in the horizontal direction. The two rails 802 and 804 may be formed in shapes and sizes corresponding to each other. A magnet 400 may be disposed between the two rails 802 and 804. The two rails 802 and 804 may be symmetrical to each other with respect to the magnet 400. Through this, it is possible to stably guide the movement of the bobbin 100.

Figure 9:
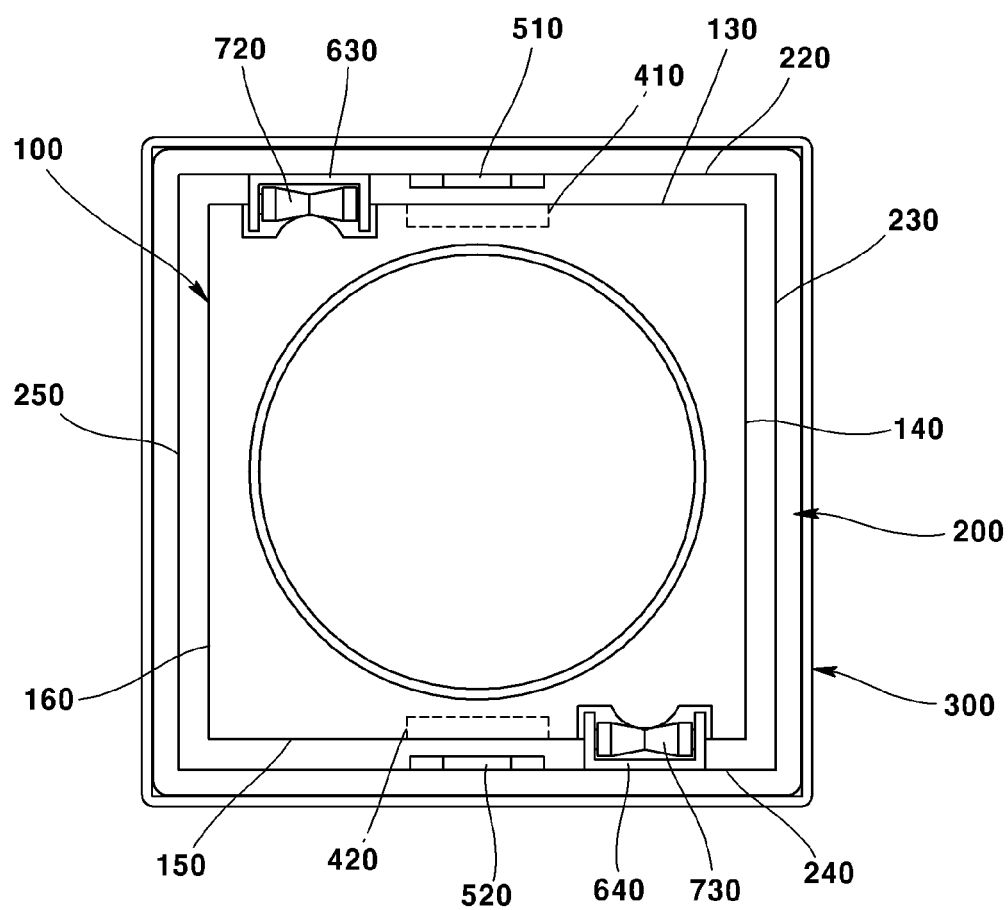
FIGS. 9 to 11 are bottom views of a modified embodiment of the lens driving device according to an embodiment of the present invention.
Figure 10:
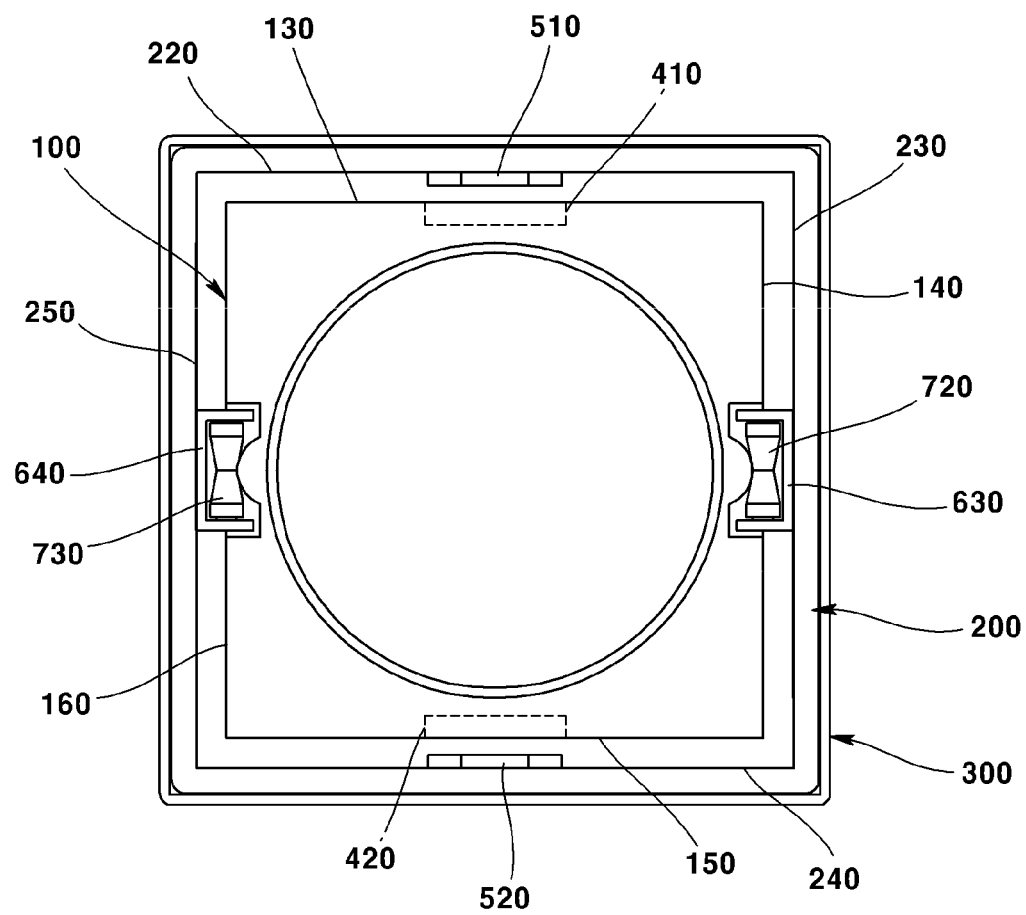
Figure 11:
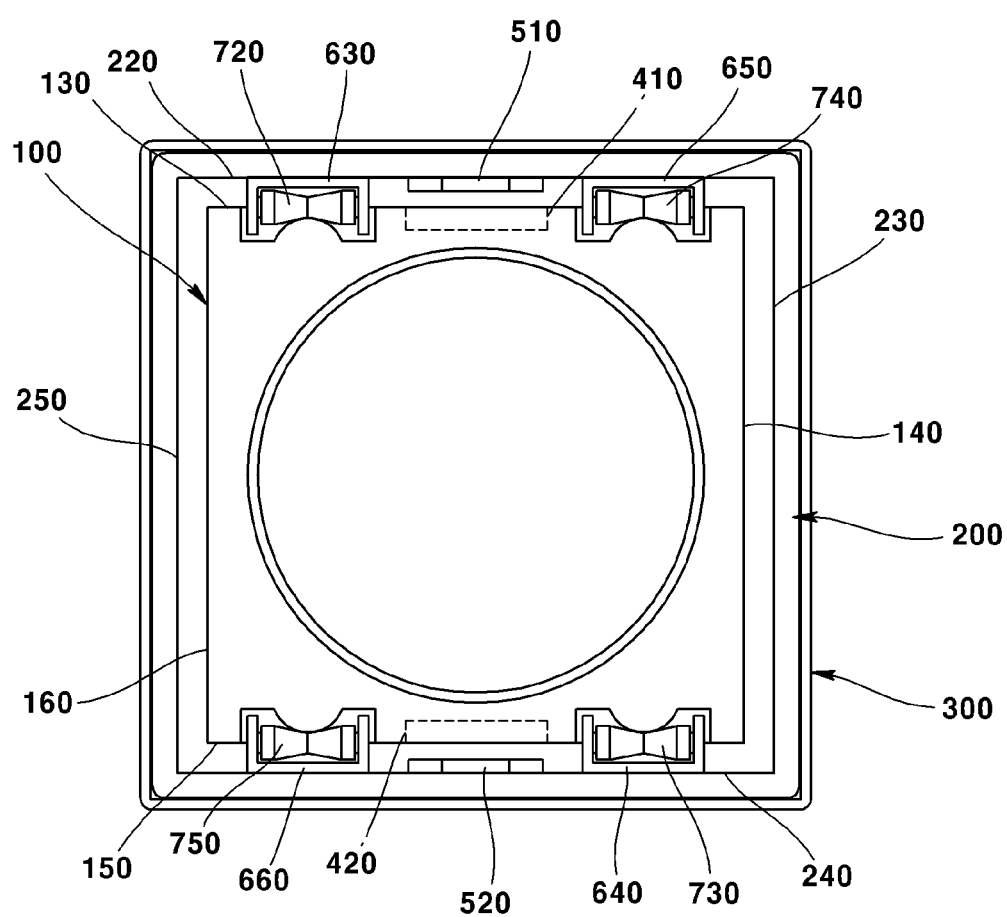

FIGS. 9 to 11 are bottom views of a modified embodiment of the lens driving device according to an embodiment of the present invention, and FIG. 12 is a perspective view of a modified embodiment of the coupling member of the lens driving device according to an embodiment of the present invention.

Referring to FIG. 9, a first magnet 410 may be disposed on a first surface 130 of the bobbin 100, and a second magnet 420 may be disposed on a third surface 150 of the bobbin 100. The first magnet 410 and the second magnet 420 may be formed at positions symmetrical to each other with respect to the optical axis C, and may be formed in shapes corresponding to each other. A first coil 510 may be disposed on a fifth surface 220 of the housing 200, and a second coil 520 may be disposed on a seventh surface 240 of the housing 200. The first coil 510 and the second coil 520 may be formed at positions symmetrical to each other with respect to the optical axis C, and may be formed in shapes corresponding to each other. The first magnet 410 and the first coil 510 may face each other, and the second magnet 420 and the second coil 520 may face each other. A first coupling member 630 may be disposed on a fifth surface 220 of the housing 200, and a second coupling member 640 may be disposed on a seventh surface 240 of the housing 200. The first coupling member 630 and the second coupling member 640 may be formed at positions symmetrical to each other with respect to the optical axis C, and may be formed in shapes corresponding to each other. In a modified embodiment, the first and second coupling members 630 and 640 may be formed of a flat plate 610 and a first and a second vertical plate 622 and 624, respectively. A first roller 720 may be disposed in the first coupling member 630, and a second roller 730 may be disposed in the second coupling member 640. The first roller 720 and the second roller 730 are formed at positions symmetrical to each other with respect to the optical axis C, and may be formed in shapes corresponding to each other. One rail 800 is disposed in the groove 120 formed in the first surface 130 of the bobbin 100, and one may be disposed in the groove 120 formed in the third surface 130 of the bobbin 100. The rail disposed in the groove 120 formed in the first surface 130 and the rail disposed in the groove 120 formed in the third surface 130 are formed at positions symmetrical to each other with respect to the optical axis C, and may be formed in a shape corresponding to each other.

Referring to FIG. 10, the first magnet 410 may be disposed on the first surface 130 of the bobbin 100, and the second magnet 420 may be disposed on the third surface 150 of the bobbin 100. The first magnet 410 and the second magnet 420 may be formed at positions symmetrical to each other with respect to the optical axis C, and may be formed in shapes corresponding to each other. The first coil 510 may be disposed on the fifth surface 220 of the housing 200, and the second coil 520 may be disposed on the seventh surface 240 of the housing 200. The first coil 510 and the second coil 520 may be formed at positions symmetrical to each other with respect to the optical axis C, and may be formed in shapes corresponding to each other. The first magnet 410 and the first coil 510 may face each other, and the second magnet 410 and the second coil 520 may face each other. The first coupling member 630 may be disposed on a sixth surface 230 of the housing 200, and the second coupling member 640 may be disposed on an eighth surface 250 of the housing 200. The first coupling member 630 and the second coupling member 640 may be formed at positions symmetrical to each other with respect to the optical axis C, and may be formed in shapes corresponding to each other. In the modified embodiment, the first and the second coupling member 630 and 640 may be formed of flat plates 610 and the first and second vertical plates 622 and 624, respectively. The first roller 720 may be disposed in the first coupling member 630, and the second roller 730 may be disposed in the second coupling member 640. The first roller 720 and the second roller 730 are formed at positions symmetrical to each other with respect to the optical axis C, and may be formed in shapes corresponding to each other.

One rail 800 is disposed in the groove 120 formed in the second surface 140 of the bobbin 100, one may be disposed in the groove 120 formed in the fourth surface 150 of the bobbin 100. The rail disposed in the grooves 120 formed in the second surface 140 and the rail disposed in the grooves 120 formed in the fourth surface 150 are formed at positions symmetrical to each other with respect to the optical axis C. It may be formed in a corresponding shape.

Referring to FIG. 11, in the modified embodiment described in FIG. 9, a third coupling member 650, a fourth coupling member 660, a third roller 740, a fourth roller 750, and two rails are added. The third coupling member 650 may be disposed on the fifth surface 220 of the housing 200, and the fourth coupling member 660 may be disposed on the seventh surface 240 of the housing 200. The third coupling member 650 and the fourth coupling member 660 are disposed at the positions symmetrical to each other with respect to the optical axis C, and may be formed in a corresponding shape. The first coupling member 630 and the third coupling member 650 may be formed at positions symmetrical to each other with respect to the first coil 510 and may be formed in shapes corresponding to each other. The second coupling member 640 and the fourth coupling member 660 may be formed at positions symmetrical to each other with respect to the second coil 520 and may be formed in shapes corresponding to each other. The third roller 740 may be disposed in the third coupling member 650, and the fourth roller 750 may be disposed in the fourth coupling member 660. The third roller 740 and the fourth roller 750 are disposed at the positions symmetrical to each other based on the optical axis C, and may be formed in shapes corresponding to each other. One rail 800 is disposed in the groove 120 formed in the first surface 130 of the bobbin 100, and one is disposed in the groove 120 formed in the third surface 130 of the bobbin 100, one is disposed in the groove 120 formed in the third surface 130 of the bobbin 100, and may be formed in a shape corresponding to positions symmetrical to each other.

In one embodiment of the present invention, the groove 120 of the bobbin 100 may be formed on at least one of the first to fourth surfaces 130, 140, 150, and 160 of the bobbin 100, and the groove 120 of the bobbin 100 formed on at least one surface may comprise a plurality of grooves. The coupling member 600, the roller 700, and the rail 800 may be formed in a number corresponding to the groove 120 of the bobbin 100 and disposed at a corresponding position. If the magnet 400 and the coil 500 are formed in a number corresponding to each other and are disposed to face each other, the number of the magnet 400 and the coil 500 may be variously changed. For example, unlike the illustrated case, the first magnet 410 and the second magnet 420 may be disposed on the adjacent surfaces, and the first coil 510 and the second coil 520 may be disposed on the adjacent surfaces. Referring to FIGS. 9 to 11, the coil 500 may be directly attached to the inner lateral surface of the housing 200 facing the magnet 400. The coil 500 may be wound on a yoke. The coil 500 may be fixed to an inner surface of a side wall of the housing 200 by disposing an adhesive on at least one surface while being wound on a yoke.

As in the modified embodiment of an embodiment of the present invention, the bobbin 100 may be prevented from being overturned (flipped) through components symmetrical in different diagonal directions with respect to the optical axis C.

Referring to FIG. 12, the plurality of rollers may comprise six rollers 712, 714, 715, 716, 718, and 719, and each of the first to fourth vertical plates 622, 624, 626, and 628 may comprise two holes, respectively. That is, at least three of the plurality of rollers may be disposed in the vertical direction. In the present invention, the plurality of rollers disposed in the vertical direction will be described as an example of two and three, but is not limited thereto and may be variously changed according to the specifications of the product.

In the lens driving device 10 according to an embodiment of the present invention, when the bobbin 100 is moved in the up-down direction, the up-down movement of the bobbin 100 may be guided through the roller 700 and the rail 800. At this time, frictional force can be minimized through two-point contact between the roller 700 and the rail 800. In addition, since the rail 800 is disposed in the groove 120 formed in the bobbin 100, the specification of the product can be minimized.

Figure 13:
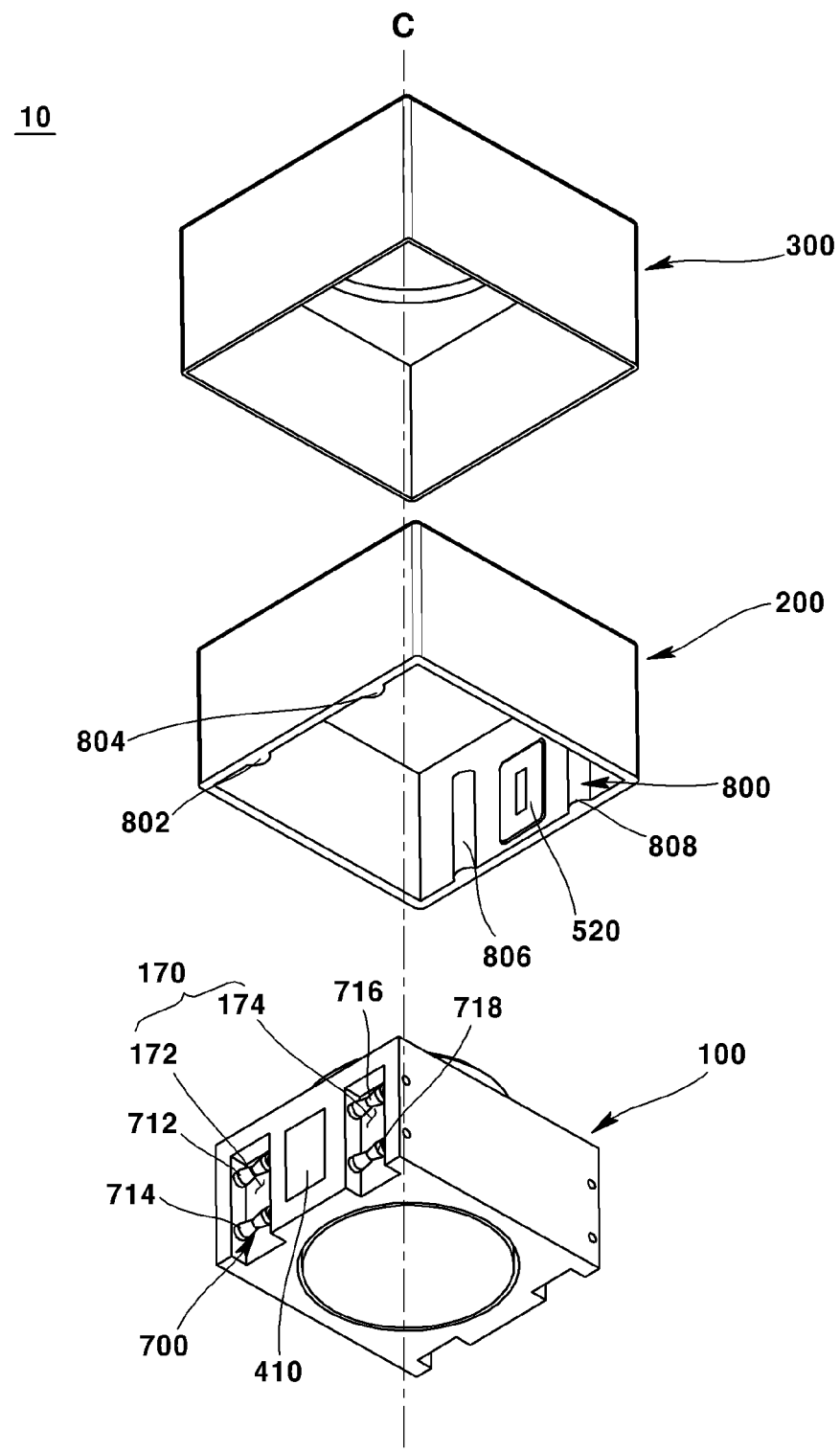
FIG. 13 is an exploded perspective view of a lens driving device according to another embodiment of the present invention.
Figure 14:
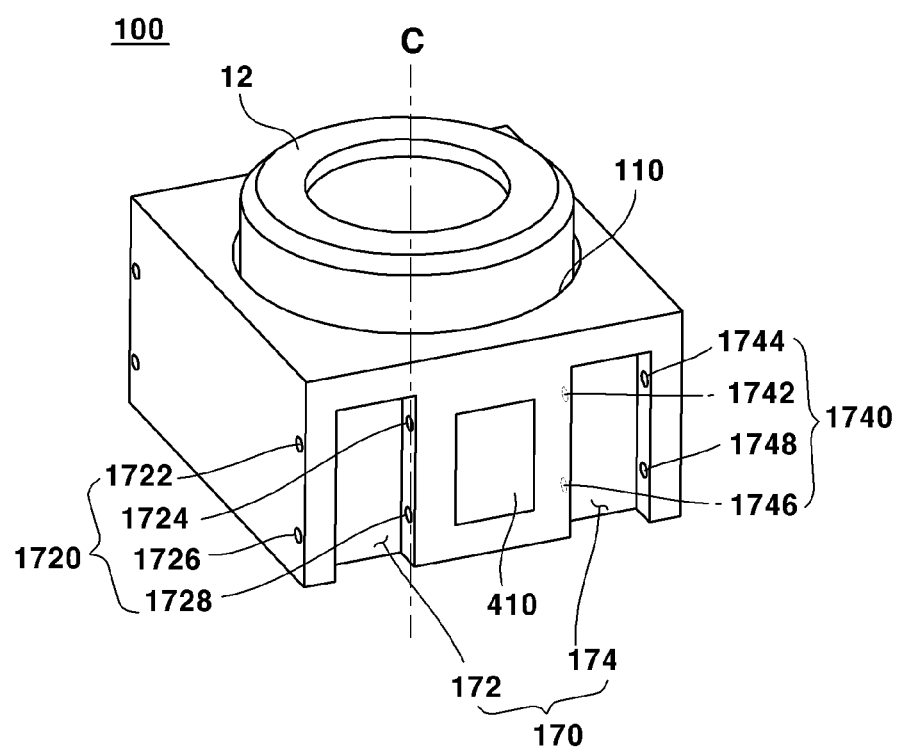
FIG. 14 is a perspective view of some components of a lens driving device according to another embodiment of the present invention.

FIG. 13 is an exploded perspective view of a lens driving device according to another embodiment of the present invention; FIG. 14 is a perspective view of some components of a lens driving device according to another embodiment of the present invention; and FIGS. 15 and 16 are bottom views of a lens driving device according to another embodiment of the present invention.

Figure 15:
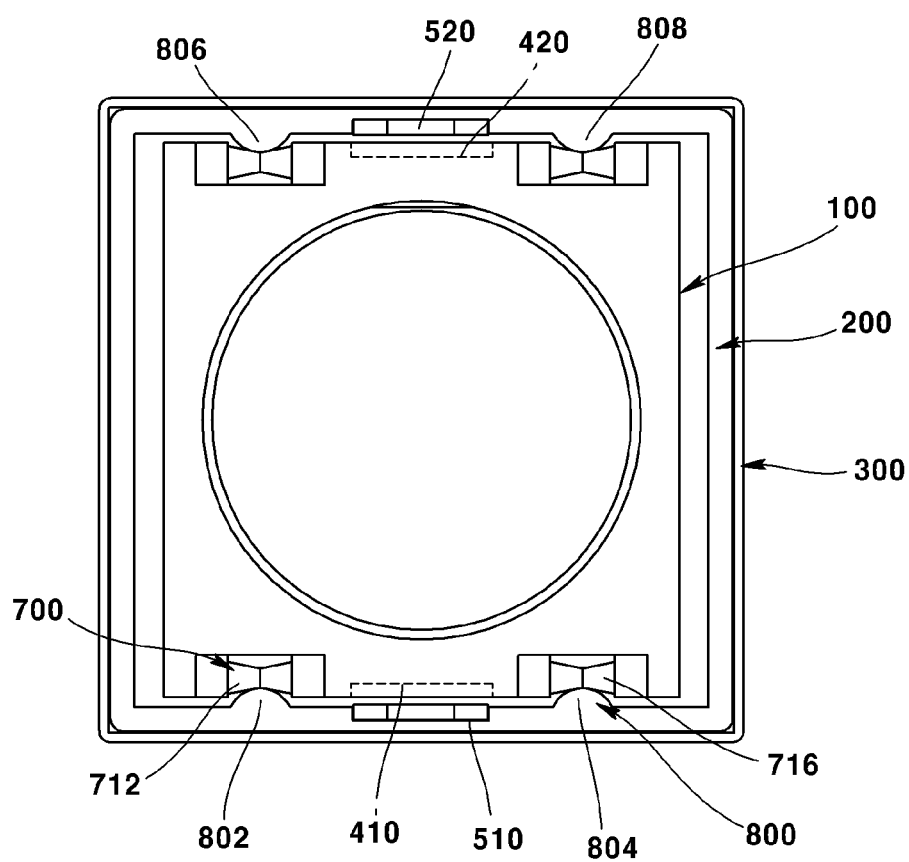
FIGS. 15 and 16 are bottom views of a lens driving device according to another embodiment of the present invention.

Referring to FIGS. 13 to 15, a lens driving device 10 according to another embodiment of the present invention comprises a bobbin 100, a housing 200, a cover can 300, a magnet 400, a coil 500, a roller 700, and a rail 800, but other additional components are not excluded. The overlapped description of the same configuration as the camera module 10 according to an embodiment of the present invention will be omitted, and the same name and the same reference numerals will be assigned to the same components.

The bobbin 100 may comprise a groove 170. The groove 170 may be a "roller groove" in which the roller 700 is disposed. Also, the groove 170 may be referred to as a 'second groove' and the like to distinguish it from other grooves. The groove 170 may be formed on the lateral surface of the bobbin 100. A roller 700 may be disposed in the groove 170. The groove 170 may be extended from the lateral surface of the bobbin 100 in the optical axis C direction or in the vertical direction. The width of the groove 170 (horizontal length) may be greater than the width of the roller 700. The width of the groove 170 may be extended from the lower end to the upper end of the bobbin 100.

The groove 170 may comprise a plurality of grooves 172 and 174 formed on one surface of the bobbin 100. The plurality of grooves 172 and 174 may be formed with a width corresponding to each other and a length corresponding to each other (vertical length). A magnet 400 may be disposed between the plurality of grooves 172 and 174. The plurality of grooves 172 and 174 may be formed at positions symmetrical to each other centered around the magnet 400.

The bobbin 100 may comprise a plurality of holes 1720 and 1740. In addition, to distinguish it from other holes, the plurality of holes 1720 and 1740 may be referred to as a 'second hole' and the like. The plurality of holes 1720 and 1740 may be disposed in the groove 170 of the bobbin 100. The plurality of holes 1720 and 1740 may be formed on inner lateral surfaces facing each other among the grooves 170 of the bobbin 100. At least a portion of the plurality of holes 1720 and 1740 may be penetrated by the protruding portion 708 of a roller 700. For example, protruding portions of each of the four rollers 712, 714, 716, and 718 may be inserted into a plurality of holes 1722, 1724, 1726, 1728, 1742, 1744, 1746, and 1748.

The housing 200 may comprise a coil groove on the inner lateral surface. The coil 500 may be disposed in the coil groove. The coil 500 is disposed in the coil groove, and at least a portion of the coil 500 may be protruded out of the coil groove.

The roller 700 may be rotatably disposed in the groove 170 of the bobbin 100. The roller 700 may comprise a plurality of rollers 712, 714, 716, and 718. At least a portion of each protruding portion 708 of the plurality of rollers 712, 714, 716, and 718 may be inserted into a plurality of holes 1722, 1724, 1726, 1728, 1742, 1744, 1746, and 1748 formed in the groove 170 of the bobbin 100.

The rail 800 may comprise a first rail 810. The first rail 810 may be disposed on the inner lateral surface of the housing 200. The first rail 810 may be integrally formed with the housing 200. After the first rail 810 is manufactured separately, it may be attached to the inner lateral surface of the housing 200. The first rail 810 can be in contact with the roller 700. The first rail 810 may comprise a plurality of first rails 812, 814, 816, and 818.

In another embodiment of the present invention, the roller 700 is disposed in the bobbin 100 through the groove 170 formed in the bobbin 100, and the first rail 810 is disposed in the housing 200. When the bobbin 100 is moved in the up-down direction by the magnetic interaction between the magnet 400 and the coil 500, the roller 700 installed on the bobbin 100 is rotated along the first rail 810 and performs rolling motion. At this time, the first rail 810 may guide the movement of the roller 700.

Referring to FIG. 16, the rail 800 may comprise a second rail 820. The second rail 820 may be disposed in the groove 170 of the bobbin 100. The second rail 820 may be disposed on the lower surface of the groove 170 of the bobbin 100. The second rail 820 may have a shape corresponding to the first rail 810. The second rail 820 may be in contact with the roller 700. When the roller 700 on one side is rotated along the first rail 810, the roller 700 on the other side is rotated in contact with the second rail 820, and thus the position of the roller 700 may be guided so that the roller 700 does not escape. The second rail 820 may comprise a plurality of second rails 822, 824, 826, and 828.

The number and arrangement of grooves 170, first and second magnets 410 and 420, first and second coils 510 and 520, rollers 700, first and second rails 810 and 820 formed on the bobbin 100 of the lens driving device 10 according to another embodiment of the present invention may be variously changed like the lens driving device 10 according to an embodiment of the present invention.

Figure 17:
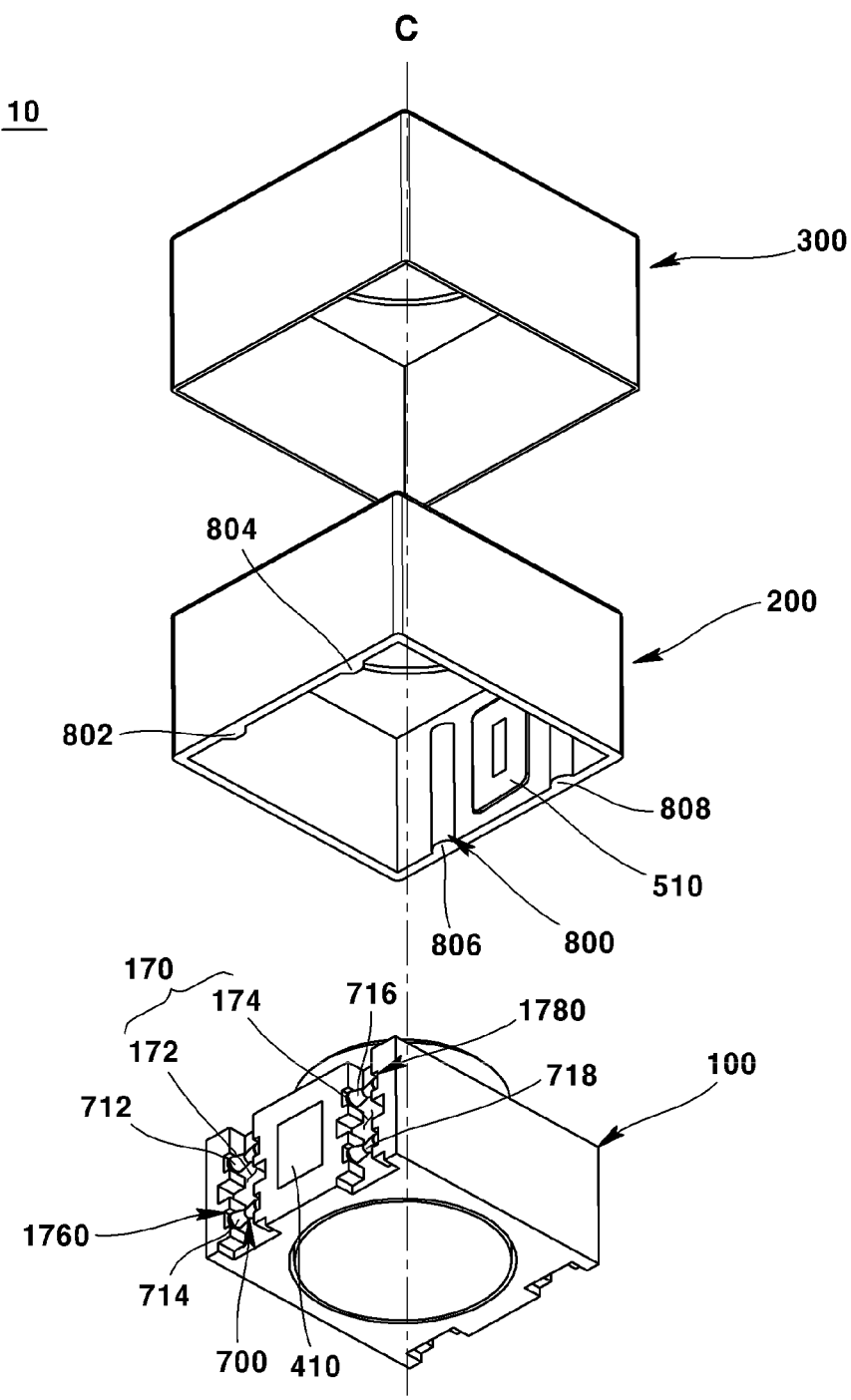
FIG. 17 is an exploded perspective view of a lens driving device according to another embodiment of the present invention.
Figure 18:
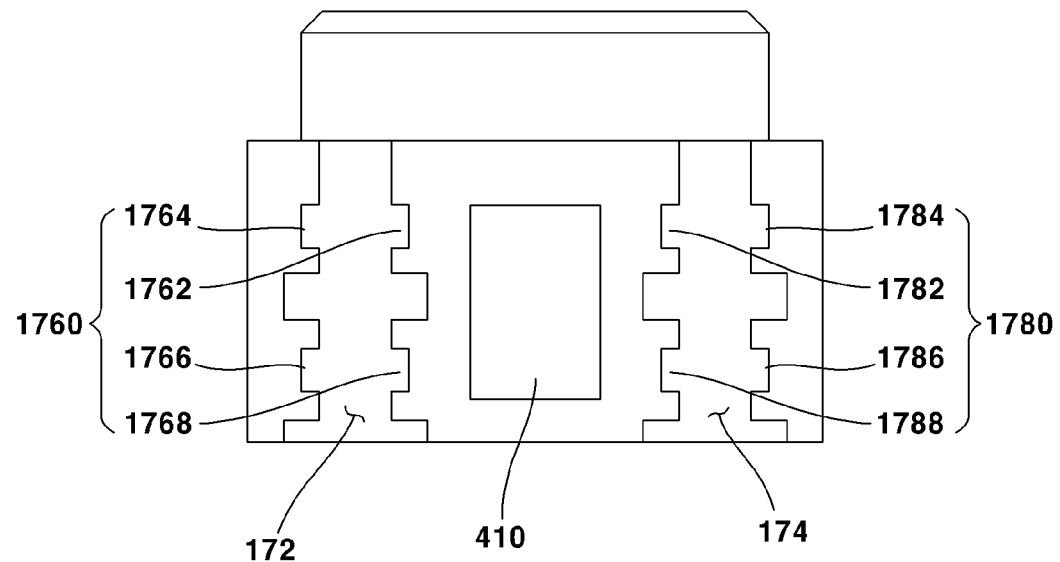
FIG. 18 is a front view of some components of a lens driving device according to another embodiment of the present invention.

FIG. 17 is an exploded perspective view of a lens driving device according to another embodiment of the present invention; FIG. 18 is a front view of some components of a lens driving device according to another embodiment of the present invention, and FIG. 19 is a cross-sectional view of some components of a lens driving device according to another embodiment of the present invention.

Figure 19:
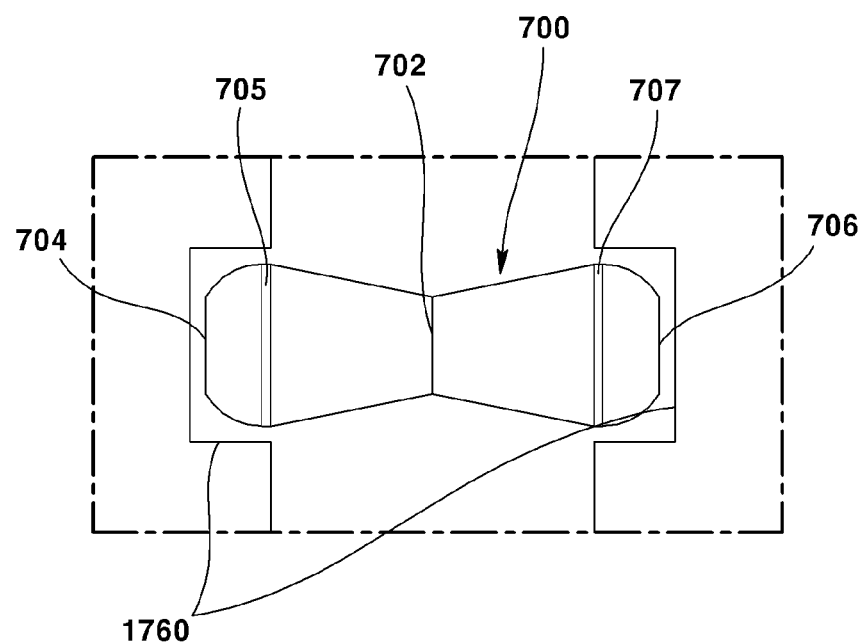
FIG. 19 is a cross-sectional view of some components of a lens driving device according to another embodiment of the present invention.

Referring to FIGS. 17 to 19, a lens driving device 10 according to yet another embodiment of the present invention comprises a bobbin 100, a housing 200, a cover can 300, a magnet 400, a coil 500, a roller 700, and a rail 800, but other additional components are not excluded. The overlapped description of the same configuration as the camera module 10 according to an embodiment of the present invention will be omitted, and the same name and the same reference numerals will be assigned to the same components.

The bobbin 100 may comprise grooves 1760 and 1780. The grooves 1760 and 1780 may be 'both end groove' at which both ends 704 and 706 of the rail 700 are disposed. In addition, to distinguish it from other grooves, the grooves 1760 and 1780 may be referred to as a 'third groove' and the like. The third grooves 1760 and 1780 of the bobbin 100 may be formed on inner lateral surfaces facing each other of the second groove 170 of the bobbin 100. The roller 700 may be disposed in the third grooves 1760 and 1780 of the bobbin 100. Both ends 704 and 706 of the roller 700 may be disposed in the third grooves 1760 and 1780 of the bobbin 100. The height of the third grooves 1760 and 1780 may be greater than the height of the roller 700. The inner lateral surfaces of the third grooves 1760 and 1780 may be spaced apart from the roller 700. Through this, the roller 700 may be rotatably disposed in the third grooves 1760 and 1780. The third grooves 1760 and 1780 of the bobbin may comprise a plurality of third grooves 1762, 1764, 1766, 1768, 1782, 1784, 1786, and 1788, respectively.

The roller 700 may be disposed in third grooves 1760 and 1780 of the bobbin 100. Both ends of the roller 700 may be disposed in third grooves 1760 and 1780 of the bobbin 100. At least a portion of the area of the roller 700 disposed in the third grooves 1760 and 1780 of the bobbin 100 may decrease in diameter as it travels toward the ends 704 and 706 of the roller 700. At least a portion of the area disposed between the inner lateral surfaces facing each other of the second groove 170 of the bobbin 100 among the rollers 700 may decrease in diameter as it travels toward the central portion 702. The roller 700 may comprise reference lines 705 and 707. The reference lines 705 and 707 may be located on the same plane as the second groove 170 where the third groove 1760 and 1780 are initiated. Among the cross-sections of the roller 700, the cross-sections of the reference lines 705 and 707 may have the largest diameter. Each of the plurality of rollers 712, 714, 716, and 718 may be disposed in a plurality of third grooves 1762, 1764, 1766, 1768, 1782, 1784, 1786, and 1788.

In embodiments of the present invention, although it has been described as an example that the magnet 400 is disposed in the bobbin 100 and the coil 500 is disposed in the housing 200, the coil 500 may be disposed in the bobbin 100, and the magnet 400 may be disposed in the housing 200.

Although embodiments of the present invention have been described above with reference to the accompanying drawings, those skilled in the art to which the present invention belongs may understand that the present invention can be implemented into other specific forms without changing the technical spirit or essential features thereof. Therefore, it should be understood that the embodiments described above are exemplary in all respects and not restrictive.

The invention claimed is:

1. A lens driving device comprising:
a housing;
a bobbin disposed in the housing;
a magnet disposed on the bobbin;
a coil disposed on the housing and facing the magnet;
a coupling member disposed on an inner lateral surface of the housing, the coupling member including:
 a flat plate on the inner lateral surface of the housing; and
 a plurality of spaced apart vertical plates extending from the flat plate toward the bobbin, each vertical plate having a hole;
a roller rotatably disposed on the coupling member, the roller including a pair of protruding portions extending at opposite ends of the roller, each protruding portion being inserted into a corresponding hole of the holes of the vertical plates; and a rail disposed on the bobbin, wherein the rail is guided according to a rotation of the roller, wherein the bobbin comprises a first groove extending in an optical axis direction on an outer lateral surface thereof, wherein a length of each vertical plate in the optical axis direction is the same as a length of the first groove in the optical axis direction, and wherein at least a portion of each vertical plate is located in the first groove of the bobbin.

2. The lens driving device of claim 1, wherein the roller comprises at least two rollers, wherein the at least two rollers are spaced apart from each other in a horizontal direction, wherein the coil is disposed between the at least two rollers, wherein the rail comprises at least two rails, wherein the at least two rails are spaced apart from each other in the horizontal direction, and wherein the magnet is disposed between the at least two rails.

3. The lens driving device of claim 1, wherein the rail is disposed in the first groove.

4. The lens driving device of claim 1, wherein the rail extends in the optical axis direction, wherein the rail protrudes toward the housing, and wherein the cross-section of the rail is a semi-circular shape.

5. The lens driving device of claim 1, wherein the bobbin comprises first to fourth surfaces formed on an outer lateral surface, wherein the magnet comprises a first magnet disposed on the first surface and a second magnet disposed on the third surface, wherein the first magnet and the second magnet are symmetrical to each other with respect to an optical axis, wherein the housing comprises fifth to eighth surfaces formed on the inner lateral surface so as to face the first to fourth surfaces, respectively, wherein the coil comprises a first coil disposed on the fifth surface and a second coil disposed on the seventh surface, wherein the first coil and the second coil are symmetrical with respect to the optical axis, wherein the coupling member comprises a first coupling member disposed on the fifth surface, and a second coupling member disposed on the seventh surface, wherein the first coupling member and the second coupling member are symmetrical to each other with respect to the optical axis, wherein the roller comprises a first roller disposed on the first coupling member, and a second roller disposed on the second coupling member, wherein the rail comprises a first rail disposed on the first surface and a second rail disposed on the third surface, and wherein the first rail and the second rail are symmetrical with respect to the optical axis.

6. The lens driving device of claim 1, wherein the bobbin comprises first to fourth surfaces formed on an outer surface, wherein the magnet comprises a first magnet disposed on the first surface and a second magnet disposed on the third surface, wherein the first magnet and the second magnet are symmetrical to each other with respect to an optical axis, wherein the housing comprises fifth to eighth surfaces formed on the inner lateral surface so as to face the first to fourth surfaces, respectively, wherein the coil comprises a first coil disposed on the fifth surface and a second coil disposed on the seventh surface, wherein the first coil and the second coil are symmetrical with respect to the optical axis, wherein the coupling member comprises a first coupling member disposed on the sixth surface, and a second coupling member disposed on the eighth surface, wherein the first coupling member and the second coupling member are symmetrical to each other with respect to the optical axis, wherein the roller comprises a first roller disposed on the first coupling member, and a second roller disposed on the second coupling member, wherein the rail comprises a first rail disposed on the second surface and a second rail disposed on the fourth surface, and wherein the first rail and the second rail are symmetrical with respect to the optical axis.

7. The lens driving device of claim 1, wherein the roller comprises a central portion, two outer portions conjoined by the central portion, and each protruding portion protrudes from a corresponding one of the two outer portions conjoined by the central portion in a direction away from the central portion, wherein a diameter of one of the two outer portions conjoined by the central portion is smaller than a diameter of the central portion, and wherein each protruding portion is rotatably coupled to the coupling member.

8. The lens driving device of claim 7, wherein a diameter of each protruding portion is smaller than the diameter of the central portion.

9. The lens driving device of claim 8, wherein the diameter of each protruding portion is smaller than the diameter of one of the two outer portions conjoined by the central portion.

10. The lens driving device of claim 1, wherein the roller is rotatably fixed to the coupling member so that the roller does not move with respect to the coupling member in the optical axis direction.

11. A camera module comprising:

a printed circuit board;

an image sensor disposed on the printed circuit board;

the lens driving device of claim 1 disposed above the printed circuit board; and a lens coupled to the bobbin of the lens driving device.

12. An optical apparatus comprising:

a main body;

the camera module of claim 11 disposed on the main body; and a display disposed on the main body and outputting an image photographed by the camera module.

13. A lens driving device comprising:

a cover can;

a housing disposed in the cover can and comprising a coupling member, the coupling member including:

a flat plate; and a plurality of spaced apart vertical plates extending from the flat plate toward the bobbin, each vertical plate having a hole;

a bobbin disposed in the housing;
a magnet and a coil disposed in the cover can and configured to move the bobbin in an optical axis;
a roller rotatably coupled to the coupling member, the roller including:
two first portions having a first diameter;
a second portion connecting the two first portions, the second portion having a second diameter smaller than the first diameter; and
a pair of protruding portions protruding from the two first portions in a direction away from the second portion, each protruding portion being inserted into a corresponding hole of the holes of the vertical plates to be rotatably coupled thereto; and
a rail formed on the bobbin,
wherein the rail is contacted with the roller,
wherein the roller guides a movement of the rail in the optical axis direction,
wherein the roller is rotatably fixed to the coupling member so that the roller does not move with respect to the coupling member in the optical axis direction,
wherein the bobbin comprises a first groove extending in an optical axis direction on an outer lateral surface thereof,
wherein a length of each vertical plate in the optical axis direction is the same as a length of the first groove in the optical axis direction, and
wherein at least a portion of each vertical plate is located in the first groove of the bobbin.

14. The lens driving device of claim 13, wherein a diameter of each protruding portion is smaller than the second diameter of the second portion.

* * * * *